(12) United States Patent
Blumka et al.

(10) Patent No.: US 8,424,194 B2
(45) Date of Patent: Apr. 23, 2013

(54) APPARATUS FOR ASSEMBLY OF A PRESS-FIT MODULAR WORK PIECE

(75) Inventors: Joseph Blumka, Shelby Township, MI (US); Kenneth J. Oswandel, Livonia, MI (US)

(73) Assignee: LG Chem, Ltd., Seoul (KR)

( * ) Notice: Subject to any disclaimer, the term of this patent is extended or adjusted under 35 U.S.C. 154(b) by 327 days.

(21) Appl. No.: 12/890,047

(22) Filed: Sep. 24, 2010

(65) Prior Publication Data

US 2011/0258846 A1 Oct. 27, 2011

Related U.S. Application Data

(60) Provisional application No. 61/326,410, filed on Apr. 21, 2010.

(51) Int. Cl.
*B23P 19/04* (2006.01)
*H01M 8/00* (2006.01)

(52) U.S. Cl.
USPC .............. 29/730; 29/714; 29/718; 100/902

(58) Field of Classification Search ........... 29/714, 29/718, 730; 100/902
See application file for complete search history.

(56) References Cited

U.S. PATENT DOCUMENTS

| | | | | |
|---|---|---|---|---|
| 4,214,519 A * | 7/1980 | Stollenwerk et al. | ........... | 100/37 |
| 6,279,224 B1 * | 8/2001 | Wirtz et al. | ........... | 29/711 |
| 6,735,852 B2 * | 5/2004 | Barge et al. | ........... | 29/730 |
| 6,834,424 B2 * | 12/2004 | Shannon | ........... | 29/623.2 |
| 2007/0113985 A1 * | 5/2007 | Gysi et al. | ........... | 156/514 |
| 2007/0214627 A1 * | 9/2007 | Hampel et al. | ........... | 29/407.01 |
| 2008/0271311 A1 * | 11/2008 | Hill et al. | ........... | 29/730 |
| 2010/0306995 A1 * | 12/2010 | Scheuerman et al. | ........ | 29/623.1 |
| 2012/0079711 A1 * | 4/2012 | Stancu et al. | ........... | 29/623.1 |

FOREIGN PATENT DOCUMENTS

| | | | |
|---|---|---|---|
| JP | 57194838 A | * | 11/1982 |
| JP | 3019730 A | | 1/1991 |
| JP | 03019730 A | * | 1/1991 |
| JP | 2007170672 A | * | 7/2007 |

OTHER PUBLICATIONS

U.S. Appl. No. 12/889,973, filed Sep. 24, 2010 entitled Ultrasonic Welding Assembly and Method of Attaching an Anvil to a Bracket of the Assembly.

(Continued)

*Primary Examiner* — A. Dexter Tugbang
*Assistant Examiner* — Anthony Green
(74) *Attorney, Agent, or Firm* — Buckert Patent & Trademark Law Firm, P.C.

(57) ABSTRACT

An apparatus for assembling a press-fit modular work piece is described that includes a surface member having a central opening. A hatch member is disposed on one side of the surface member, and is moveable between a first position where it does not cover the opening and a second position covering the opening. A work piece receiving member is disposed proximate the other side of the surface member across from the central opening for receiving components of the press-fit modular work piece. An actuator moves the work piece receiving member toward the opening so components of the work piece press against the hatch member when the hatch member is moved into the second position. The actuator moves the work piece receiving member to a position to receive components of the work piece when the hatch member is in the first position.

8 Claims, 5 Drawing Sheets

OTHER PUBLICATIONS

U.S. Appl. No. 12/897,097, filed Oct. 4, 2010 entitled Press Assembly and Method for Bending Electrical Terminals of Battery Cells.
U.S. Appl. No. 13/077,124, filed Mar. 31, 2011 entitled Tape Application Machine and Method for Applying an Electrically Non-Conductive Tape to a Battery Cell.
U.S. Appl. No. 12/889,973 filed Sep. 24, 2010 entitled Ultrasonic Welding Assembly and Method of Attaching an Anvil to a Bracket of the Assembly.
U.S. Appl. No. 12/897,097 filed on Oct. 4, 2010 entitled Press Assembly and Method for Bending Electrical Terminals of Battery Cells.
U.S. Appl. No. 13/077,124 filed Mar. 31, 2011 entitled Tape Application Machine and Method for Applying an Electrically Non-Conductive Tape to a Battery Cell.

\* cited by examiner

APPARATUS FOR ASSEMBLY OF A PRESS-FIT MODULAR WORK PIECE

CROSS-REFERENCE TO RELATED APPLICATIONS

This application claims priority to U.S. Provisional Patent Application No. 61/326,410 filed on Apr. 21, 2010, the entire contents of which are hereby incorporated by reference herein.

BACKGROUND

This application relates to an apparatus for assembly of a press-fit work piece, such as a battery cell assembly.

In response to the demand for high-output battery applications such as for electric vehicles, modular battery cell stack assemblies have been developed. These stack assemblies may comprise multiple repeating units of a module that has generally planar battery cell members and other planar components such as gaskets, heat exchangers, and the like sandwiched between generally planar frame members. The planar frame members have retaining features thereon that are disposed perpendicular to the plane of the planar frame, which are adapted to engage retaining features on adjacent frame members in the stack when pressed together. The engagement of these retaining features holds the stack together and retains the sandwiched members securely between the frame members.

One way to assemble battery cell assemblies such as those described above has been to align the components and press them together in a manual operation, which required repeated manual applications of force to secure one frame to the next. In addition to being highly inefficient, such manual assembly can cause operator fatigue.

Accordingly, the inventors herein have recognized a need for an apparatus for assembling a modular work piece such as a modular battery cell stack assembly that mitigates the above deficiency.

SUMMARY

An apparatus for assembling a press-fit modular work piece in accordance with an exemplary embodiment is provided. The apparatus includes a surface member having a central opening therein extending between first and second opposing sides of the surface member. The apparatus further includes a hatch member disposed on the first side of the surface member. The hatch member is moveable between a first position not covering the central opening and a second position covering the central opening. The apparatus further includes a position sensor configured to generate a signal indicating when the hatch member is in the second position. The apparatus further includes a work piece receiving member configured to receive components of the press-fit modular work piece, disposed proximate the second side of the surface member and proximate to the central opening. The apparatus further includes an actuator configured to move the work piece receiving member either toward or away from the central opening. The apparatus further includes a controller configured to receive the signal from the position sensor. The controller is further configured to induce the actuator to move the work piece receiving member toward the central opening such that components of the press-fit modular work piece are pressed against the hatch member when the hatch member is moved into the second position.

The apparatus described above provides for efficient assembly of press-fit modular work pieces such as battery assemblies. This and other advantages and features will become more apparent from the following description taken in conjunction with the drawings.

DETAILED DESCRIPTION

Figure 1:
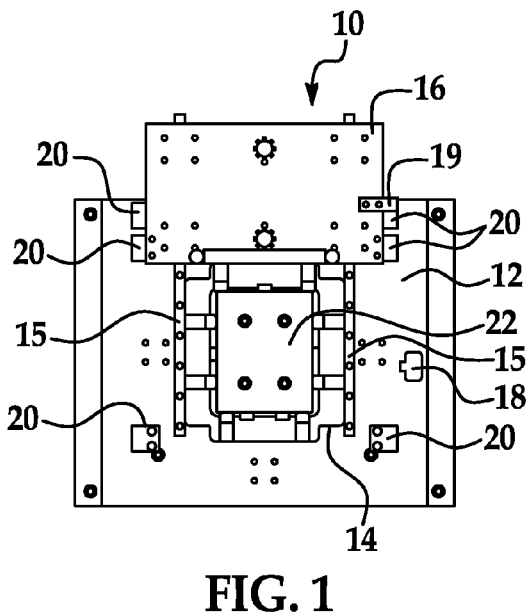
FIG. 1 is a top view of an apparatus for assembly of a press-fit work piece in accordance with an exemplary embodiment.
Figure 2:
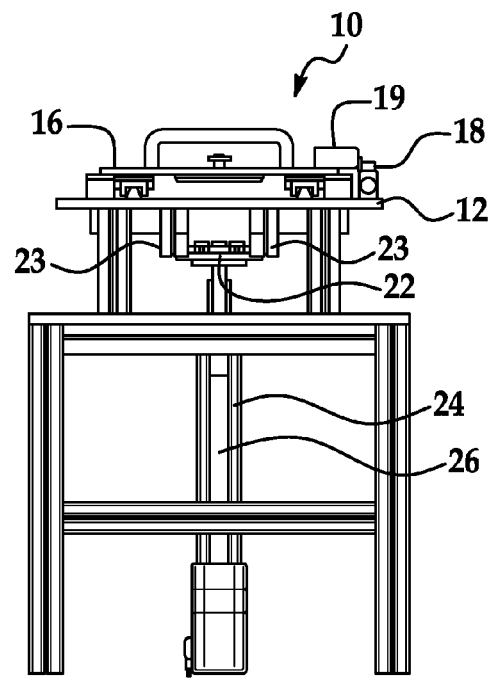
FIG. 2 is a front view of the apparatus shown in FIG. 1.
Figure 3:
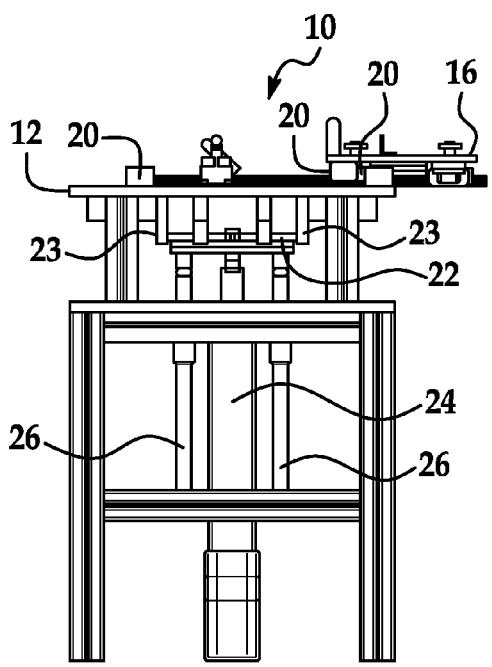
FIG. 3 is a side view of the apparatus shown in FIG. 1.
Figure 4:
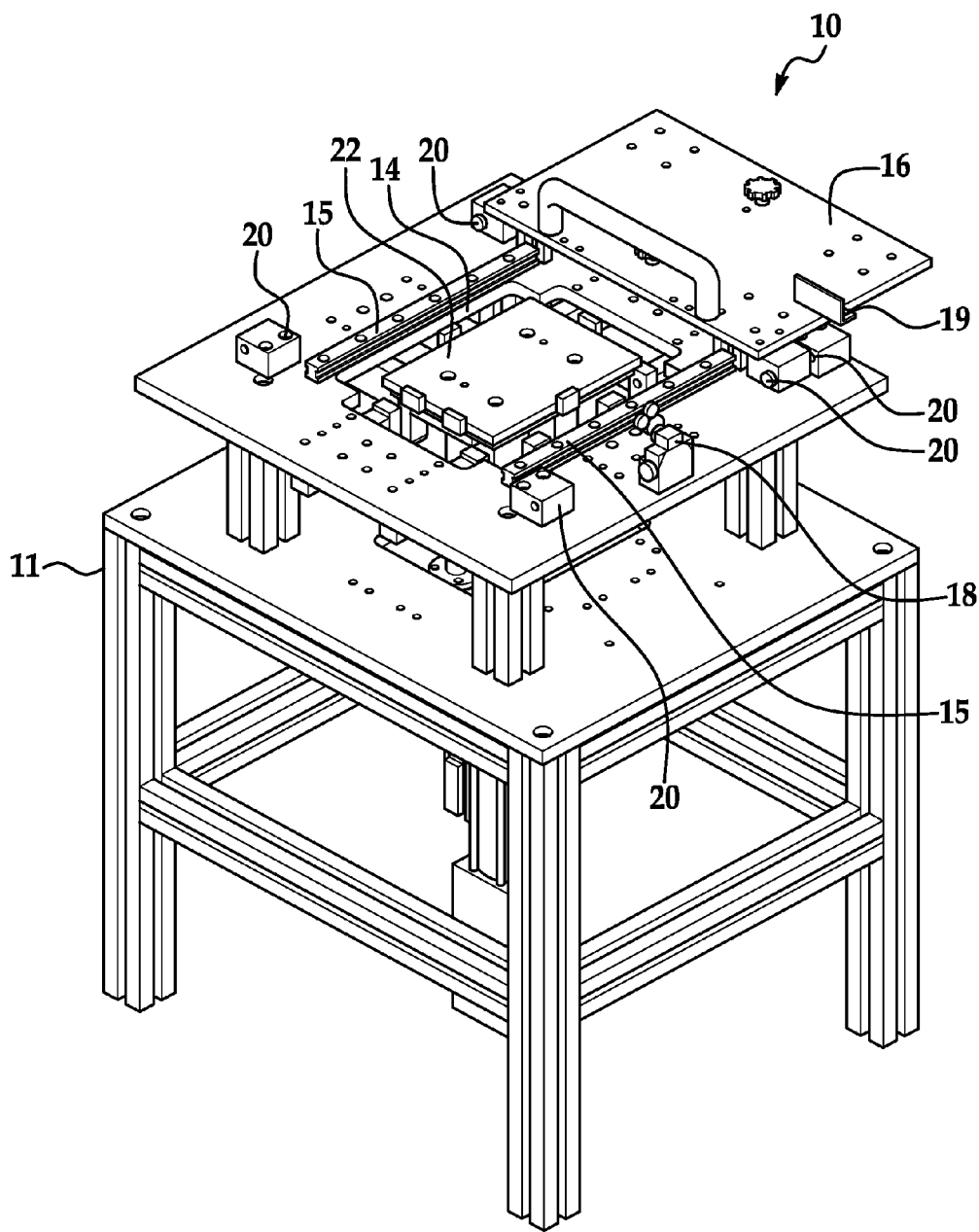
FIG. 4 is an isometric view of the apparatus shown in FIG. 1.

Referring to FIGS. 1-4, an apparatus 10 for assembly of a press-fit modular work piece in accordance with an exemplary embodiment is illustrated. The apparatus 10 has a work stand 11, a surface member 12, guide rails 15, a hatch member 16, a position sensor 18, a sensor flag 19, a work piece receiving member 22, an actuator 24, guide rods 26, and a controller 40. The stand 11 supports the other components of the apparatus 10.

The surface member 12 has a central opening 14 therein. On the upper side of the surface member 12, the hatch member 16 is disposed that is moveable along the guide rails 15 between a first position (shown in FIGS. 1-4) not covering the central opening 14 (i.e., the open position) and a second position (not shown in FIGS. 1-4) covering the central opening (i.e., the closed position). The surface member 12 and the hatch member 16 are equipped with stop members 20 for limiting the movement of the hatch member 16 between the open and closed positions. The surface member 12 is also equipped with a position sensor 18 and the hatch member 16 is equipped with a sensor flag 19 for determining whether or not the hatch member 16 is in the closed position.

The position sensor 18 is configured to generate a signal indicating when the hatch member 16 is in the closed position. In one exemplary embodiment, the position sensor 18 detects the sensor flag 19 when the hatch member 16 is in the closed position. The position sensor 18 is coupled to the surface member 12 and is electrically coupled to the controller 40. Various types of sensors (e.g., Hall effect sensor, optical sensor, electromechanical trip switch, robotic vision, and the like, with or without a sensor flag) can be used for the position sensor 18.

The work piece receiving member 22 is configured to receive components of the press-fit modular work piece and is disposed on the lower side of the surface member 12 proximate to the central opening 14. It should be noted that the relative upper and lower orientations of the hatch member 16 and the work piece receiving member 14 are shown for convenience of illustration, but that the entire apparatus could be inverted with the hatch member 16 below the surface member 12 and the work piece receiving member 22 (and associated components) above the surface member 12. Other orientations (e.g., sideways) could be utilized as well.

The actuator 24 is connected to the work piece receiving member 22 for moving the work piece receiving member 22 toward or away from the opening. The actuator 24 may be any type of known actuator such as an electric ball-screw actuator, a hydraulic piston actuator, or other actuators as are known in the art. The guide rods 26 assist in maintaining level orientation of the work piece receiving member 22 as the work piece receiving member 22 is moved up and down by the actuator 24.

The lower side of the surface member 12 is also equipped with locating features 23 for aligning components of the press-fit modular work piece on the work piece receiving member 22 so the components fit together properly during assembly.

The force sensor 21 is configured to generate a signal indicative of an amount of force being applied by the actuator 24 when compressing components of the press-fit module work piece together against the hatch member 16. The force sensor is operably coupled to the actuator 24 and is electrically coupled to the controller 40.

Figure 5:
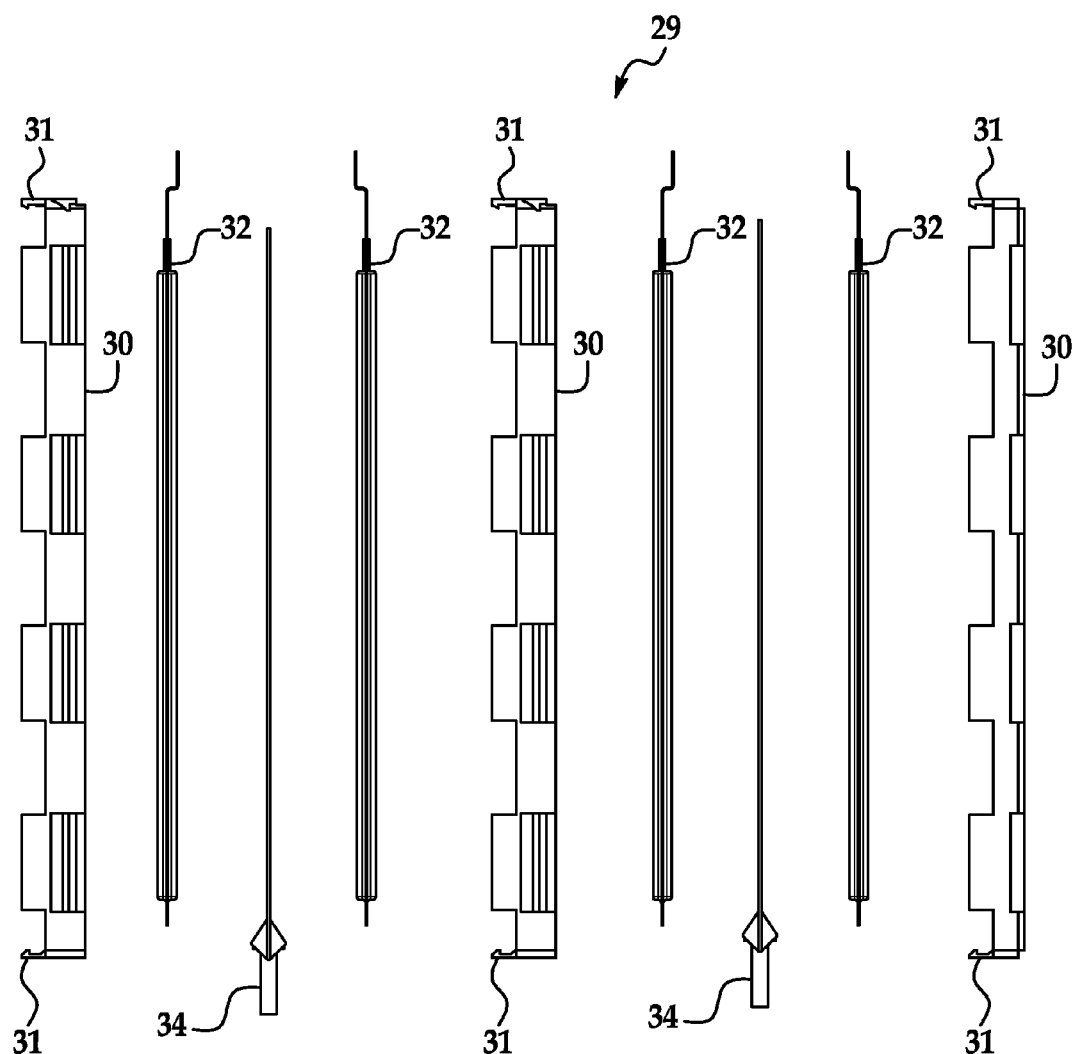
FIG. 5 is an exploded view of an exemplary embodiment of a press-fit modular work piece that the apparatus shown in FIG. 1 may be used to assemble.

Referring to FIG. 5, components for an exemplary press-fit modular battery cell assembly 29, which can be press fit together using the apparatus 10, are shown in an exploded view. The components shown in FIG. 5 represent a repeating modular configuration of a frame member 30, a battery cell member 32, a cooling fin member 34, and another battery cell member 32, followed by another frame member 30 and a repetition of the pattern. Of course, this is only representative of an exemplary configuration, and many other configurations can be used. Frame member 30 has retaining features 31 thereon, which are adapted to engage with the adjacent frame in the stack assembly. To assemble the press-fit modular assembly of FIG. 5, a single module of frame member 30, the battery cell member 32, the cooling fin member 34, another battery cell member 32, and another frame member 30 are loosely stacked together, followed by applying force to urge the two frame members together until the respective retention features 31 engage using the apparatus 10. Then a second module is added by disposing a battery cell member 32 adjacent to one of the frame members 30 of the now partially assembled modular assembly, and loosely stacking thereon cooling fin member 34, another battery cell member 32, and a frame member 30, followed by pressing together to cause the retaining feature 31 on the newly added frame member 30 to engage with the adjacent frame member 30 on the already partially-assembled modular assembly using the apparatus 10.

Figure 6:
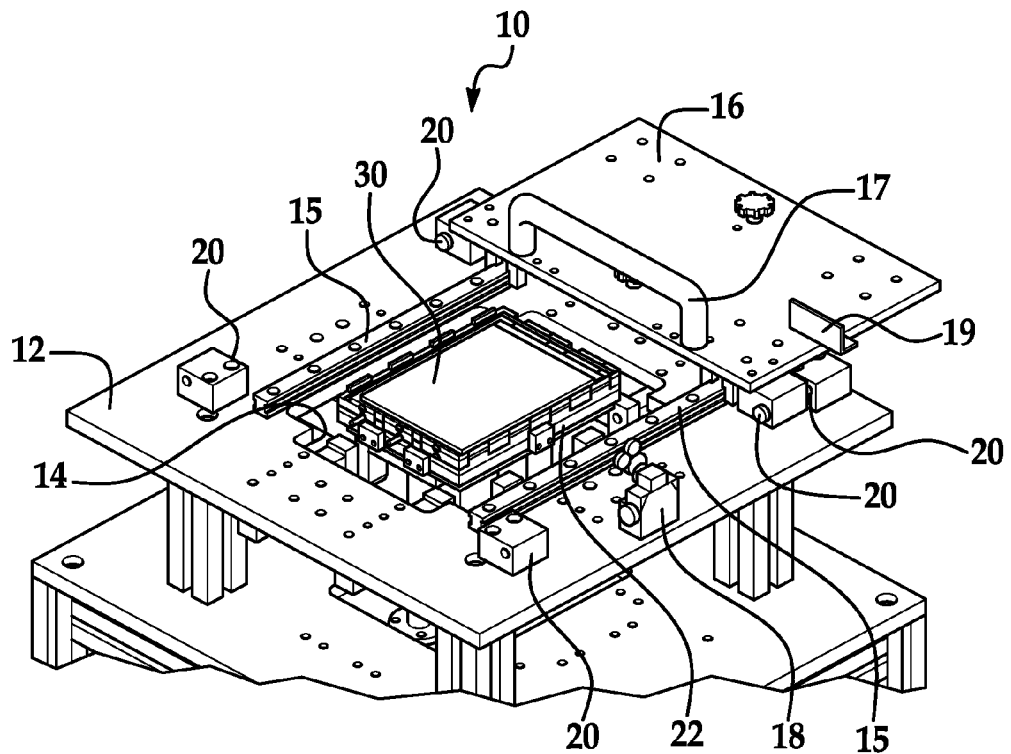
FIG. 6 is an isometric view of the apparatus shown in FIG. 4 with a unassembled components of a press-fit work piece mounted thereon for assembly.
Figure 7:
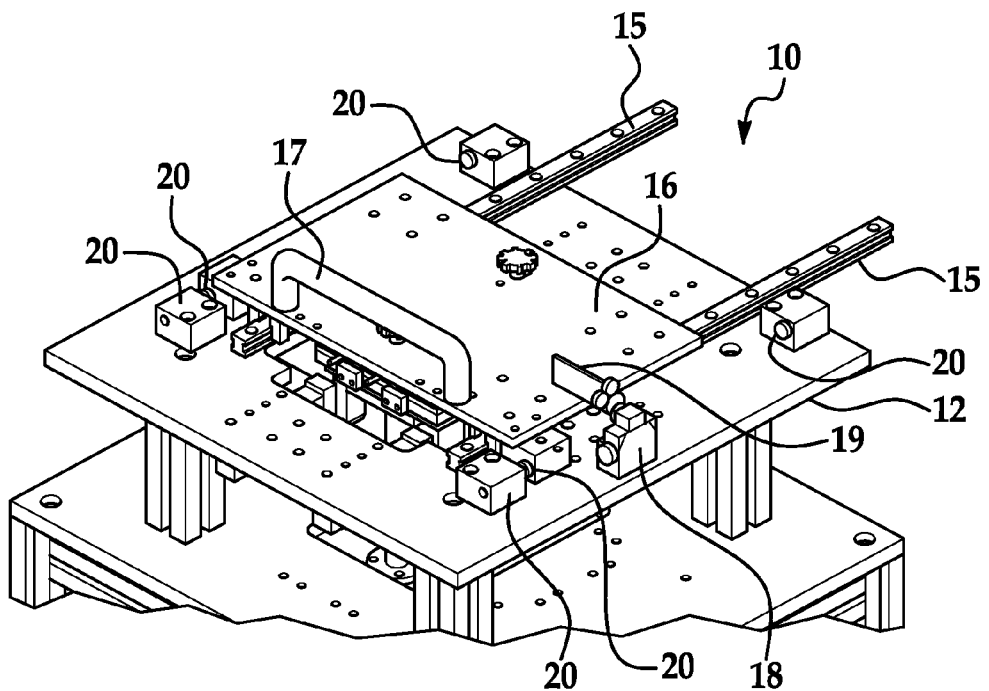
FIG. 7 is an isometric view of the apparatus shown in FIG. 6 with the hatch member closed and ready for assembly of the press-fit work piece.

Referring to FIGS. 6 and 7, these Figures show the movement of the hatch member 16 between the open or first position away from the central opening 14 of the surface member 12 and the closed or second position covering the central opening 14 of the surface member 12. Movement of the hatch member 16 may be accomplished manually by pulling on a handle 17, or may be done automatically such as by sensors, actuators, and electronic control.

Figure 8:
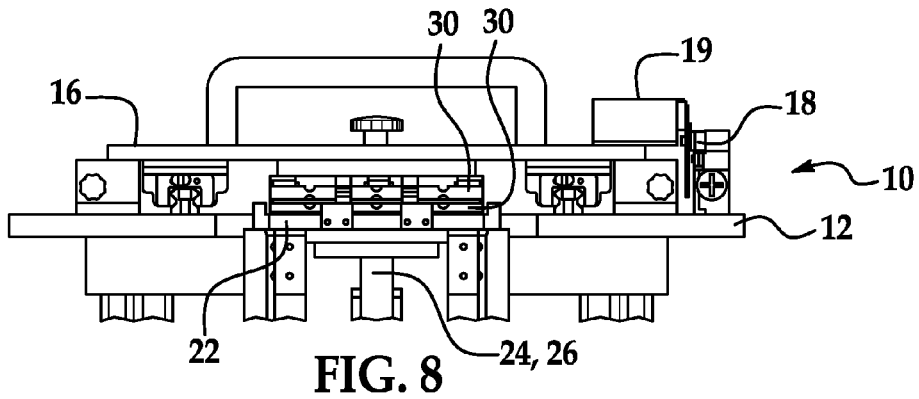
FIG. 8 is a side view of the apparatus shown in FIG. 6 with the hatch member closed ready for assembly of the press-fit work piece.

Referring to FIGS. 8-11, these Figures illustrate sequential steps in the operation of the apparatus 10. In FIG. 8, with the hatch member 16 in the open position (note that the open and closed positions of the hatch member 16 appear identical in FIGS. 8-11 due to the orientation of the plan view of these Figures), components of a press-fit modular assembly such as the one shown in FIG. 5 are loosely stacked on top of the work piece receiving member 22. In FIG. 8, two frame members 30 are shown, but the intervening components (e.g., battery cells, cooling fin(s), and other optional components like gaskets) cannot be distinctly seen due to the proximity of the frame members to each other.

Figure 9:
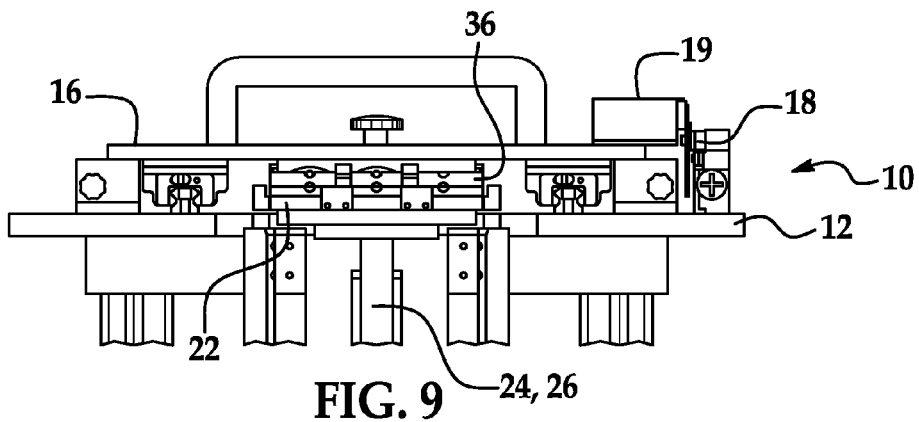
FIG. 9 is a side view of the apparatus as shown in FIG. 8 during a sequential stage of the assembly process with the components of the work piece pressed together.

In FIG. 9, the hatch member 16 has been moved to the closed or second position covering the central opening 14, and actuator 24 cooperates with guide rods 26 to move the work piece receiving member 22 through the central opening 14 to cause the upper frame 30 to contact the hatch member 16. Continued force applied by the actuator 24 causes retaining features on the frames to engage with each other and press-fit together, resulting in partially assembled modular assembly 36.

Figure 10:
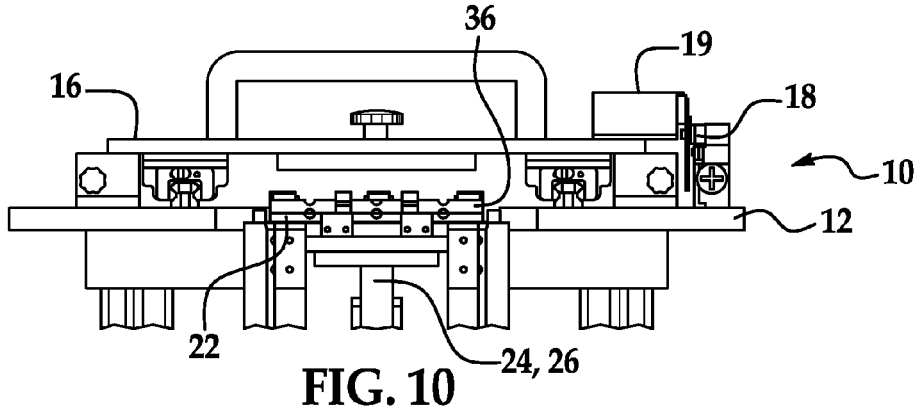
FIG. 10 is a side view of the apparatus as shown in FIG. 9 during a sequential stage of the assembly process with the partially-assembled work piece returned to a position for the placement of additional work piece components.

In FIG. 10, the actuator 24 lowers the work piece receiving member 22 so that the upper surface of the partially assembled modular assembly 36 is in a proper location to receive additional modular components for assembly. A comparison of FIGS. 8 and 10 shows that the upper surface of the partially assembled modular assembly 36 in FIG. 10 is at approximately a same vertical position as the work piece receiving member 22 was in FIG. 8. This position adjustment may be accomplished using various automatic control techniques. For example, an optical sensor (not shown) may generate a signal indicative of a position of the upper surface of the partially assembled modular assembly 36 that the controller 40 utilizes to induce the actuator 24 to move to a proper position. Alternatively, the controller 40 may utilize a preprogrammed adjustment to reset to a position lower than the previous position by a predetermined amount equal to the thickness of one repeat unit in the modular stack assembly.

Figure 11:
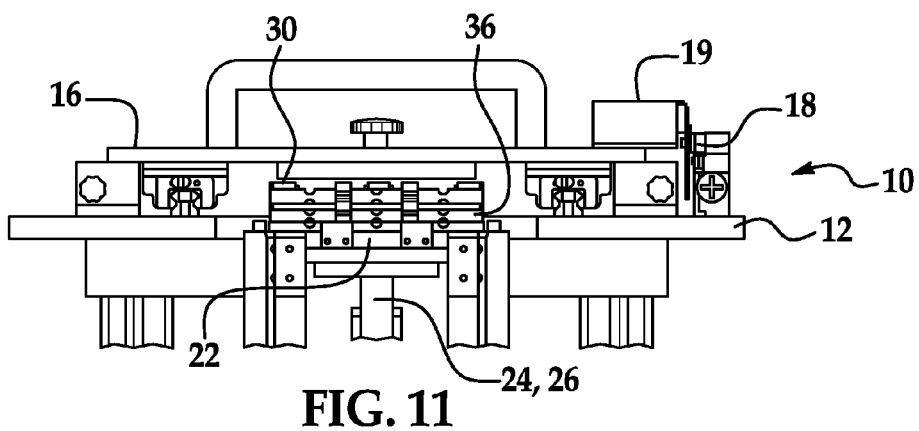
FIG. 11 is a side view of the apparatus as shown in FIG. 10 during a sequential stage of the assembly process with additional work piece components placed onto the partially-assembled work piece and ready to be pressed together.

In FIG. 11, the hatch member 16 is again moved to its open or first position and new components (e.g., battery cell members, cooling fin members, gaskets) are loosely stacked onto the partially assembled modular assembly 36 followed by another frame member 30. Following this, the hatch member 16 may be moved to its closed position and the above-described sequence of operations can be repeated to press fit the modular assembly together.

The above-described sequence of operations may be repeated as many times as needed to assemble a press-fit modular assembly with a desired number of repeat units.

Figure 12:
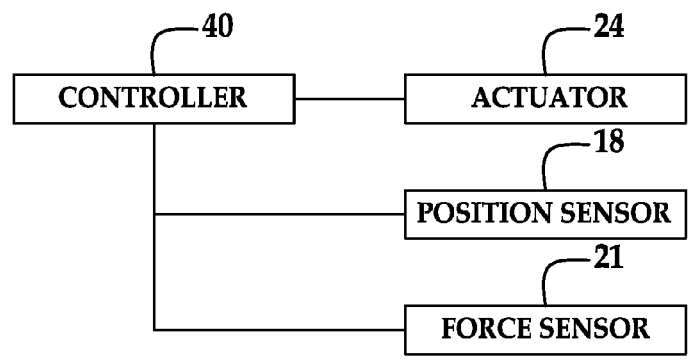
FIG. 12 is a block diagram of a controller, actuator, and sensor utilized in the apparatus of FIG. 1.

Referring to FIG. 12, a block diagram of the controller 40, the actuator 24, the position sensor 18, and the force sensor 21 is illustrated. In one exemplary embodiment, the controller 40 is a computer. However, the controller 40 may be any sort of known controller, such as a microprocessor or a solid state circuit. The controller 40 is connected to and generates control signals for inducing the actuator 24 to move the work piece receiving member 22 to desired positions. In particular, the controller 40 can be programmed to induce the actuator 24 to move the work piece receiving member to either predetermined positions or predetermined distances. Also, when compressing work piece components together, the controller 40 can be programmed to induce the actuator 24 to move until an amount of force applied to the work piece components by the actuator 24 is greater than or equal to a predetermined amount of force (e.g., 200 lbs of force 250 lbs of force, 300 lbs of force, 350 lbs of force, 400 lbs of force, or 30% of a maximum force, for example), as detected by the force sensor 21. The controller 40 can store the commanded distances of the actuator 24 and the amount of force applied by the actuator 24 to the work piece components, in an internal memory device.

The controller 40 is also connected to the position sensor 18 for receiving signals from the position sensor 18 indicating whether the hatch member 16 is at a closed position. As discussed above, when the controller 40 receives a signal from the position sensor indicating movement of hatch member 16 into the closed position the controller 40 generates control signals to induce the actuator 24 to move the work piece receiving member 22 toward the hatch member 16 such that components of the work piece are pressed against the hatch member 16 to press fit the work piece components together. Thereafter, the controller 40 induces the actuator 24 to move the work piece receiving member 22 to a position for receiving additional modular work piece components. In one exemplary embodiment, the controller 40 may be disposed on the work stand 11. In another exemplary embodiment, the controller 40 may be disposed at a remote location relative to the work stand 11.

Other optional components may also be connected to controller 40, such as another position sensor that generates a signal indicative of a position of work piece receiving member 22, or a second actuator that moves the hatch member 16 between the open and closed positions in response to control signals from the controller 40, for automatic control of the movement of hatch member 16.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

What is claimed is:

1. An apparatus for assembling a press-fit modular work piece, comprising:
    a surface member having a central opening therein extending between first and second opposing sides of the surface member;
    a hatch member disposed on the first side of the surface member, the hatch member being moveable between a first position not covering the central opening and a second position covering the central opening;
    a position sensor configured to generate a signal indicating when the hatch member is in the second position;
    a work piece receiving member configured to receive components of the press-fit modular work piece, disposed proximate the second side of the surface member and proximate to the central opening;
    an actuator configured to move the work piece receiving member either toward or away from the central opening; and
    a controller configured to receive the signal from the position sensor, the controller further configured to induce the actuator to move the work piece receiving member toward the central opening such that components of the press-fit modular work piece are pressed against the hatch member when the hatch member is moved into the second position.

2. The apparatus of claim 1, wherein the controller is further configured to induce the actuator to move the work piece receiving member to a position to receive components of the press-fit modular work piece when the hatch member is in the first position.

3. The apparatus of claim 1, further comprising one or more features for aligning components of the press-fit modular work piece prior to assembly.

4. The apparatus of claim 1, wherein the press-fit modular work piece comprises a battery cell stack assembly having a plurality of repeating modular units, the modular units having a frame member, and one or more battery cell members, the frame member having a retaining feature adapted to engage a retaining feature on frame members of adjacent modules in the battery cell stack assembly.

5. The apparatus of claim 1, wherein the controller compensates for height of any partially assembled components of the press-fit modular work piece when inducing the actuator to move the work piece receiving member into position to receive additional components of the press-fit modular work piece.

6. The apparatus of claim 1, further comprising a work stand that supports thereon: the surface member, the hatch member, the position sensor, the work piece receiving member, and the actuator.

7. The apparatus of claim 1, further comprising a force sensor configured to generate a signal indicative of an amount of force applied to the components of the press-fit modular work piece, the signal from the force sensor being received by the controller.

8. The apparatus of claim 7, wherein the controller is further configured to induce the actuator to move the work piece receiving member to a position to receive additional components of the press-fit modular work piece when the signal from the force sensor indicates the amount of force is greater to or equal to a predetermined amount of force.

* * * * *